3,046,303
PROCESS FOR THE PURIFICATION OF LIQUIDS
Philip Alexander Cruickshank, Lexington, Mass., assignor to E. I. du Pont de Nemours and Company, Wilmington, Del., a corporation of Delaware
No Drawing. Filed Sept. 9, 1959, Ser. No. 838,830
7 Claims. (Cl. 260—486)

This invention relates to a process for the removal of impurities from essentially nondistillable liquids. More particularly it relates to the removal of copper salts and acidic compounds from olefinically unsaturated addition polymerizable liquids. Specifically it relates to the removal of said impurities by treatment of an acrylic ester solution with a basic reacting copper complexing reagent, i.e., ammonia.

The standard method of preparing the unsaturated esters of polyols, particularly such esters of the α-methylene carboxylic acids, e.g., triethylene glycol diacrylate, is by a direct esterification reaction. The reaction is generally carried out in the presence of acid catalysts and metallic compounds, e.g., cuprous oxide, cuprous chloride and other cuprous salts, as thermal polymerization inhibitors. The acid catalysts and metallic salts present are undesirable except in very minute quantities. This is particularly true when the unsaturated esterification product is used in the preparation of photopolymerizable compositions. Since the ester product is essentially nondistillable (except under very extreme conditions with the use of special equipment), the undesirable materials present cannot be removed by distillation. It is known, however, that the copper and acid impurities can be removed by aqueous extraction means using several brine extractions (to remove the copper) followed by several brine-bicarbonate extractions (to remove the remaining acidic substances). The brine also minimizes the solubility of the monomer in the aqueous phase. This purification technique has several disadvantages, however, e.g., it requires large volumes of aqueous solutions, it is time consuming, and the waste disposal problem is acute.

It has been found that the diesters of alpha-methylene carboxylic acids prepared by the standard procedure referred to above can be purified by extraction of the crude diester reaction product after removal of the water formed by azeotropic distillation (which may take place simultaneously with esterification) with a neutral brine solution and then with aqueous ammonia or other aqueous alkaline media containing copper chelating agents, e.g., aqueous solutions of sodium bicarbonate, ethylenediamine tetraacetic acid, diethyltriamine, pentaacetic acid, aminotriacetic acid, triethanolamine, citric acid and salicylic acid, in which any remaining copper salts are soluble. However, these new purification procedures, while commercially practical, have the disadvantage that they require a number of extraction steps and deal with volumes of solutions. In addition, if the aqueous ammonia solution remains in contact with the diester for more than about 20 minutes, it adds on to the ethylenic double bond.

An object of this invention is to provide a simple and effective process for removing copper impurities from diesters of polyols with acrylic and alpha-substituted acrylic acids (alpha-methylene carboxylic acids). Another object is to provide such a process which is economical and does not result in significant hydrolysis of the diester. Yet another object is to provide such a process which does not result in additions to the double bonds in the polyesters. A further object is to porvide such a process which results in diesters of sufficient purity as to be useful in making high quality photopolymerizable layers for making halftone and line printing plates. Still further objects will be apparent from the following description of the invention.

According to the process of the present invention, alpha-methylene carboxylic acid diesters of polyols, e.g., ethylene glycol or propylene glycol and their polyglycols, having an average molecuar weight of not more than 600 and containing cuprous oxide, cuprous chloride and other cuprous salts and compounds, and also acid esterification catalysts as impurities, are purified by removing such impurities by passing a gaseous stream of anhydrous ammonia into a solution of the impure diesters which is maintained at a temperature within the range 0° C. to 30° C. until precipitation of copper compounds is complete and the pH of a dilute aqueous slurry sample is between about 5.5 and about 8.5. The precipitate is removed by filtration and to the diester filtrate there is admixed particles of a water-insoluble cation exchange agent, e.g., ortho- and meta-, di- and trisilicic acid, and a polymeric organic carboxylic or sulfonic acid, e.g., polystyrenesulfonic acid. The agent can be added in several successive portions and the diester solution filtered after each portion. In general, after two such additions, the amount of copper is reduced to about 1 to 2 parts per million. As an exemplary procedure, an α-methylene carboxylic acid diester, e.g., triethylene glycol diacrylate or a polyethylene glycol diacrylate whose diol precursor preferably had a molecular weight of 300 to 400, is prepared by the direct esterification of the glycol and acrylic acid by refluxing the mixture (using a moisture trap) in the presence of sulfuric acid as the catalyst, benzene as the azeotroping agent and solvent and cuprous oxide as the inhibitor. Into the cold solution of the reaction product is bubbled a stream of anhydrous ammonia until the precipitation is complete and the pH of a sample of dilute aqueous slurry is between 5.5 and 8.5, preferably 6 to 8. The solids are then removed by filtration. The filtrate obtained is treated with at least two portions of orthosilicic acid insoluble in the solution of the esterification product, preferably a total of about 20 grams of silicic acid per gram of copper in the original esterification solution. After each portion of the acid is added, the solution is refiltered.

The invention will be further illustrated by, but is not intended to be limited to the following examples:

*Example I*

A mixture of 450 g. (3 moles) of triethylene glycol, 440 g. (6 moles) of glacial acrylic acid containing 0.1 percent by weight of p-methoxyphenol, 1.9 g. cuprous oxide, 11.7 g. of sulfuric acid and 450 ml. of heptane were mixed and heated under reflux for 5 hours. A total of 11.3 ml. of water was separated from the condensed azeotrope over this period, and the reaction temperature rose from 92.5° C. to 101.5° C. The reaction solution was cooled to 5° C. in an ice bath and 375 ml. of benzene was added to the solution. A slow stream of anhydrous ammonia was bubbled through the cold solution for 20 minutes. A precipitate began to form and a deep blue color developed after 10 minutes. The solids were removed by filtration. Most of the blue copper complex was removed with the solids but some remained dissolved in the filtrate. The filtrate was treated by adding successively two 15 g. portions of silicic acid, followed by filtering after each addition. The discoloration was completely removed. The pH of the filtrate determined in aqueous acetone was 7.9. Solvents were removed from the reaction product by concentration under reduced pressure (62–65° C./20–28 mm. of mercury for 90 minutes). The yield of triethylene glycol diacrylate was 660 g. (86% yield), the refractive index at $n_D^{25}$ was 1.4619 and the pH in aqueous acetone was 7.1.

To 50 g. of the triethylene glycol diacrylate prepared as described above, there was added 0.05 g. of anthraquinone and 0.05 g. of mucochloric acid. One hundred grams of cellulose acetate hydrogen succinate and 100 ml. of water were then added. The mixture was stirred for 5 minutes and was allowed to stand overnight. A portion of the wet mixture, 150 g., was milled for 5 minutes at 105° C. on a rubber mill and was formed in a sheet, 30 mils in thickness, by pressing for 3 minutes in a hydraulic press, the platens of which had been preheated to 160° C. A 2 inch by 5 inch segment was cut from the sheet and was placed over a 0.017 inch sheet of adhesive coated "alodized" aluminum as described in Example 1 of assignee's Burg application, Serial No. 750,868, filed July 25, 1958. (The aluminum sheet was "alodized" by treating with proprietary compositions sold by the American Chemical Paint Company, Ambler, Pennsylvania, said treatment is also described in Example 1 of the Burg application.) The sandwich formed was placed in a hydraulic press, the platens of which had been preheated to 145° C. and was pressed for 3 minutes at 200 p.s.i. After the platens had cooled, the laminated element was removed from the press and was exposed through a negative process transparency to an 1,800-watt high-pressure mercury-arc lamp for 1.5 minutes at a distance of 1.5 inches. The unexposed areas were washed out by spraying the element with a 0.08 N aqueous solution of sodium hydroxide for about 7 minutes. A printing plate was formed which when used for printing in a flat press gave satisfactory results.

*Example II*

A mixture of 846 g. of polyethylene glycol with an average molecular weight of 300, 408 g. of glacial acrylic acid containing 0.1 percent by weight of p-methoxyphenol, 2.8 g. of cuprous oxide, 7.6 ml. of sulfuric acid and 285 ml. of benzene was heated under reflux for 7 hours by the procedure described in Example I. Into a 250 ml. portion of the above solution was bubbled a stream of anhydrous ammonia at the rate of 0.1 cubic foot per hour. After seven minutes, precipitation appeared. The gas flow was stopped after 1⅓ hours with the solution pH at 8.0 and the solution was filtered. The filtrate had a blue coloration. The filtrate was then slurried successively with two 16 g. portions of silicic acid, followed by filtering after each addition. Solvents were removed by vacuum stripping at 50° C. and 20–30 mm. of mercury pressure for 30 to 60 minutes. The solution was colorless, essentially all the undesirable copper was removed.

The purified solution just described was used to make a photopolymerizable composition which was coated onto a support to form a photopolymerizable layer. The resulting photopolymerizable element when exposed and processed to form a printing relief resulted in a satisfactory printing relief.

The unsaturated esters which can be purified by the present process, i.e., those prepared by the reaction of a polyol having an average molecular weight of up to about 600 and α-methylene carboxylic acid, include preferably triethylene glycol diacrylate and polyethylene glycol diacrylates (molecular weight of the diol precursor of up to 600). In addition, the following unsaturated esters can be purified, e.g., those esters having a plurality of addition polymerizable ethylenic linkages, particularly when present as terminal linkages, and especially those wherein at least one and preferably most of such linkages are conjugated with a doubly bonded carbon, including carbon doubly bonded to such heteroatoms as nitrogen, oxygen and sulfur. Outstanding are such materials wherein the ethylenically unsaturated groups, especially the vinylidene groups, are conjugated with ester structures. The following specific compounds are further illustrative of this class: unsaturated esters of polyols, particularly such esters of the α-methylene carboxylic acids, e.g., ethylene glycol diacrylate, diethylene glycol diacrylate, glycerol diacrylate, glycerol triacrylate, ethylene glycol dimethacrylate, 1,3-propylene glycol dimethacrylate, 1,2,4-butanetriol trimethacrylate, 1,4-cyclohexanediol diacrylate, 1,4-benzenediol dimethacrylate, pentaerythritol tetramethacrylate, 1,3-propylene diacrylate, 1,5-pentanediol dimethacrylate, the bisacrylates and methacrylates of polyethylene glycols of molecular weight 200 to 600, and the like. Outstanding esters are prepared wherein the molecular chain between the hydroxyls of the polyols is solely carbon or oxygen-interrupted carbon.

To aid in the reaction thermal polymerization inhibitors, esterification catalysts, azeotrope agents and solvents are present.

Suitable copper thermal polymerization inhibitors which can be used during the esterification reaction include cuprous oxide, cuprous chloride and cuprous sulfate. Useful acid esterification catalysts are sulfuric acid, p-toluene sulfonic acid, etc.

The above-disclosed impurities can be essentially removed from the esterification product by slowly passing anhydrous ammonia into the liquid product. The length of time for introducing the anhydrous ammonia into the esterification product should be kept to a minimum and of course is dependent upon the amount of product prepared and amount of surface contact. The precipitation reaction should be complete before the introduction of the ammonia is stopped. A simple test to insure complete reaction is to test a sample of dilute aqueous slurry for pH. If the pH is between about 5.5 to 8.5, preferably 6 to 8, the reaction is generally complete.

Suitable azeotrope agents and solvents include benzene, toluene, cyclohexane, heptane, and 1,2-dichloroethane, etc. It is important that the azeotropes and solvents do not attack the monomeric product.

To insure essentially complete removal of copper impurity, an insoluble acid cation exchanger is added to the ester product filtrate, e.g., 20 grams of silicic acid per gram of copper in the original esterification solution. A suitable acid cation exchanger in addition to silicic acid in polystyrene sulfonic acid. Other suitable cation exchange agents or resins are described in U.S. Patents 2,366,007, 2,578,937 and 2,692,244.

The instant novel process is useful for the purification of unsaturated esters prepared from polyols and α-methylene carboxylic acid in the presence of a copper thermal polymerization inhibitor and acid catalyst. The purified ester which is addition-polymerizable in the presence of actinic light can be used with polymeric filler and initiator components to prepare printing plates of the types described in Plambeck U.S. Patents 2,760,863 and 2,791,504 and the application of Martin and Barney, Serial No. 596,766, filed July 9, 1956, U.S. Patent 2,927,022. The purified addition-polymerizable ester is the primary component of a photosetting adhesive, as in the preparation of safety glass, for example, for the production of photo-cross-linked plastics, and for the application of raised designs to surfaces. In addition, the photopolymerizable compositions are useful for affixing phosphors to surfaces to provide color television screens, or to form indicia on instrument panels.

The instant process is advantageous because by quick, simple operations the acid and copper impurities in the unsaturated ester product are reduced to negligible amounts. The preferred process eliminates the use of extraction purification operations in the preparation of addition-polymerizable ethylenically unsaturated compounds thereby reducing the quantity of materials required for purification and the amount of waste liquors. As a result, the process permits a significant saving of time and cost.

What is claimed is:

1. A process for purifying an ethylenically unsaturated polyester of a polyol which comprises passing gaseous anhydrous ammonia into a solution of an azeotropic organic solvent maintained at a temperature within the range of 0° C. to 30° C. and a polyester of a polyol, said polyol having an average molecular weight of not more than about 600 taken from the group consisting of polyhydric alcohols of 2–6 carbon atoms containing only hydrocarbon radicals and hydroxyl groups and polyethylene and polypropylene glycols and of an alpha-methylene monocarboxylic acid, said polyester containing cuprous oxide and cuprous chloride as impurities until precipitation of copper compounds is complete and the pH of a dilute aqueous slurry of the treated polyester is between about 5.5 and about 8.5, physically removing the precipitated copper compounds from the solvent solution containing the unsaturated polyester, admixing with the solvent solution a water-insoluble cation exchange agent and filtering the resulting solution to remove said agent.

2. A process as defined in claim 1 wherein said agent is silicic acid.

3. A process as defined in claim 1 wherein said agent is polystyrene sulfonic acid.

4. A process as defined in claim 1 wherein said diesters are the diacrylates.

5. A process as defined in claim 1 wherein said polyester is a mixture of polyethylene glycol diacrylates wherein the glycol precursor had an average molecular weight of 300 to 400.

6. A process as defined in claim 1 wherein said azeotropic solvent is benzene.

7. A process for purifying an ethylenically unsaturated polyester of a polyol which comprises passing gaseous anhydrous ammonia into a solution of an azeotropic organic solvent maintained at a temperature within the range of 0° C. to 30° C. and a polyester of a polyol, said polyol having an average molecular weight of not more than about 600, selected from the group consisting of polyhydric alcohols of 2–6 carbon atoms containing only hydrocarbon radicals and hydroxyl groups, and polyethylene and polypropylene glycols and of an alpha-methylene monocarboxylic acid, said polyester containing cuprous oxide and cuprous chloride as impurities until precipitation of copper compounds is complete and the pH of a dilute aqueous slurry of the treated polyester is between about 5.5 and about 8.5, filtering the precipitated copper compounds from the solvent solution containing the unsaturated polyester, admixing with the filtrate a water-insoluble cation exchange agent and filtering the resulting solution to remove said agent.

References Cited in the file of this patent

UNITED STATES PATENTS 2,465,991    Anderson et al. _____ Apr. 5, 1949